United States Patent [19]
Rodger

[11] Patent Number: 5,623,966
[45] Date of Patent: Apr. 29, 1997

[54] FLOW CONTROL CHOKE WITH SHUTOFF SEAL

[75] Inventor: John E. Rodger, San Antonio, Tex.

[73] Assignee: Baker Hughes Incorporated, Houston, Tex.

[21] Appl. No.: 513,441

[22] Filed: Aug. 10, 1995

[51] Int. Cl.$^6$ .................................................. F16K 5/04
[52] U.S. Cl. ................................ 137/625.32; 251/283
[58] Field of Search .................... 137/625.31, 625.32; 251/283, 310

[56] References Cited

U.S. PATENT DOCUMENTS

| | | | |
|---|---|---|---|
| 1,139,221 | 5/1915 | Potter | 137/625.32 X |
| 1,517,877 | 12/1924 | Wallem | 251/283 X |
| 3,135,293 | 6/1964 | Hulsey | 137/625.31 |
| 4,406,442 | 9/1983 | Bettin et al. | 251/283 X |
| 5,217,046 | 6/1993 | Woods . | |

OTHER PUBLICATIONS

Catalog, Cooper Choke Systems, 1992, 6 pages.
Catalog, McEvoy–Willis, 6 pages.
Catalog, Taylor Tools, 12 pages.
Catalog, Wheatley MOV Chokes, 7 pages.
Catalog, KF Inline Chokes, 4 pages.
Catalog, Baker Delta Valve, 13 pages.
Catalog, H B Company, 3 pages.
Catalog, Seaboard Product Bulletin, 2 pages.
Catalog, Hydril High Performance Chokes, 7 pages.
Catalog, Valvcon, 6 pages.

*Primary Examiner*—John C. Fox
*Attorney, Agent, or Firm*—Browning Bushman

[57] ABSTRACT

A choke 10 for controlling the flow of fluid along the pressurized flow line includes a body 12 having a fluid inlet aligned with a fluid outlet. A stationary outer sleeve 64 is secured within the body, and has radially opposing sleeve flow ports 102, 104 therein each preferably spaced approximately 90° from the inlet axis. A rotary inner sleeve 56 is mounted within the stationary sleeve and is rotatable about a common sleeve axis 88. The inner sleeve has similar opposing ports 110, 112, so that rotation of the rotary sleeve adjusts the circumferential position of the ports to control the flow of fluid through the choke. An elastomeric seal 130, 132 circumferentially surrounding each sleeve port in one of the sleeves is provided for sealing engagement with the other sleeve. A bonnet cover 20 is removably affixed to the valve body 12 for facilitating removal of both the stationary sleeve and the rotary sleeve.

30 Claims, 2 Drawing Sheets

FLOW CONTROL CHOKE WITH SHUTOFF SEAL

FIELD OF THE INVENTION

The present invention relates to flow control chokes of the type commonly used in hydrocarbon recovery operations for selectively controlling the flow of fluid along a pressurized line and for reducing the downstream pressure. More particularly, this invention relates to a choke which benefits from self-impingement of fluid flow while providing a reliable shutoff seal for closing off flow through the choke.

BACKGROUND OF THE INVENTION

Flow control chokes have been used for decades in drilling and production operations involving hydrocarbon recovery. Flow control chokes are commonly used on wellheads and in production manifolds to regulate the flow of fluids from a well, and to desirably reduce a high fluid pressure to a more manageable fluid pressure downstream from the choke. Chokes are also commonly used in well testing, and in stimulation and remedial recovery operations.

Most flow control chokes are either of the type which utilize multiple orifice valves (MOV) or a needle and seat arrangement both to reduce downstream pressure and to close off the flow of fluids through the choke. MOV chokes typically rotate one disk with throughports relative to a stationary disk with similar ports to control fluid flow through the choke. These chokes generally rely upon the high upstream fluid pressure to force one disk into sealing engagement with the other disk to close off flow through the choke. Chokes with needle and seat arrangements are generally considered satisfactory for operations involving relatively clean fluids, but are not widely used in applications where the fluids are highly corrosive or contain contaminants.

Many commercially available chokes rely upon a choke body design wherein the fluid inlet is angled at 90° relative to the fluid outlet. While these right angle chokes are satisfactory for some applications, a choke with a fluid inlet "in-line" with the fluid outlet is preferred for various applications, such as those involving horizontal wellheads. Some in-line chokes require that the valve body be removed from the flow line to service the valve. These chokes thus experience high maintenance and repair costs, and are not generally utilized in applications involving corrosive or contaminated fluids.

Top entry chokes offer the advantage of an in-line choke design and the capability of servicing the choke without removing the body from the flow line. U.S. Pat. No. 5,217, 046 discloses a top entry choke including opposing internal orifices which cause the high pressure fluid to impinge upon itself within the body of the choke. This flow impingement desirably dissipates some of the high pressure energy in the upstream fluid, thereby reducing the wear on internal choke components. The choke disclosed in the '046 patent utilizes a seal between multiple orifice disks to seal off fluid flow through the choke. The CFB choke sold by Valve Concepts International also utilizes a flow impingement design, with an outer flow cone being axially movable relative to an inner seat nozzle to control the number of flow ports exposed to high pressure fluid and thereby reduce the downstream fluid pressure to a desired valve.

Most chokes do not maintain a reliable shutoff seal over a reasonable period of time. High pressure forces acting on the MOV disks create high friction which both wears the seals and requires a high torque to operate the choke. The needle and seat which combine to form the primary seal are each in the flow path of the fluid transmitted through the choke. The seal in needle and seat chokes thus experiences high wear, particularly when the choke is used with corrosive or contaminated fluids, and when the choke operates in a partially closed position. Since complete shutoff of chokes often cannot be maintained, many applications utilize a choke to reduce downstream pressure in a flow line, and utilize a conventional gate valve downstream from the choke to reliably seal off the fluid flow through the line.

Many choke designs include numerous components which experience high wear. Accordingly, the cost of maintaining chokes is a significant factor which has limited the use of chokes. Other choke designs are complex, and cannot be easily adapted to accommodate a top entry, in-line choke design. A choke which can reliably withstand high pressure fluids and which is capable of shutting off fluid flow over an extended period of time has long been desired. Such an improved choke is capable of use in numerous applications which heretofore have utilized a choke and a separate flow control valve downstream from the choke.

The disadvantages of the prior art are overcome by the present invention, and an improved choke is hereinafter disclosed which is relatively simple in design and construction, is readily serviceable, and which is able to maintain a reliable shutoff seal to close off fluid flow through the choke. The primary seal in the choke is not in the direct flow path of the fluid transmitted through the choke, which substantially enhances the life of the choke.

SUMMARY OF THE INVENTION

A choke according to the present invention is useful for reducing high pressure fluids, including corrosive fluids and fluids containing contaminants, to desired low pressure levels. Such fluids are commonly associated with hydrocarbon recovery operations, and the present invention has particular utility as a drilling or production choke for numerous injection and recovery operations involved in the hydrocarbon recovery industry. The choke of the present invention includes a stationary sleeve secured to the choke body, and a rotatable sleeve axially aligned with the stationary sleeve. Each sleeve includes side throughports for controlling fluid flow from the fluid inlet to the fluid outlet, and for causing incoming fluid to self-impinge within a flow chamber in the radially inner sleeve. The choke is able to reliably close off fluid flow using an elastomeric seal circumferentially surrounding each fluid port in the wall of one sleeve for fluid-tight sealing engagement between the sleeves when the choke is in its closed position. The choke uniquely combines features which result in long life and reduced maintenance, and utilizes a simplistic yet reliable configuration of components to combine desirable features of a choke with a shutoff valve.

In a preferred embodiment, the fluid inlet and the fluid outlet are "in-line." A bonnet removably fixed to the body provides top entry for easy removal of both the outer stationary sleeve and the inner rotary sleeve. An annulus is provided between the body and the outer sleeve for maintaining fluid communication between the inlet port and the pair of flow ports through the outer sleeve each spaced approximately 90° from the inlet port. A one-quarter turn stem operation between the fully closed and fully opened positions is thereby obtained. A pressure relief valve is provided in the side of the body for relieving fluid pressure in the annulus prior to top entry servicing.

The elastomeric seals adjacent the sleeve flow ports are guided during stem rotation by a lower annular spacer and an upper annular spacer. In a preferred embodiment, these spacers may act between inner circumferential surface on the outer sleeve and the outer circumferential surface on the inner sleeve. The lower annular spacer also functions to seal between the outer sleeve and the inner sleeve. A flowthrough port is provided in the stationary outer sleeve for providing inlet fluid pressure to the outer cylindrical surface of the inner rotary sleeve. A flow passageway in the outer sleeve provides communication between the inlet fluid pressure and the top external surface of the closed end of the rotary sleeve. The balanced pressure design reduces wear on components, and substantially contributes to the long life of the choke. A wear sleeve may be pressed into fixed engagement against the inner cylindrical surface of the rotatable inner sleeve. A wear plate may also be provided for covering an internal surface of the closed end of the rotary sleeve.

It is an object of the present invention to provide an improved choke which utilizes flow impingement within the choke body. The choke uses a stationary sleeve with radially opposing flow ports therein and a rotary sleeve co-axial with the stationary sleeve and including corresponding flow ports therein. An elastomeric seal carried by one of the sleeves circumferentially surrounds each of the flow ports therein for maintaining sealed engagement between the sleeves when the choke is in the closed position.

It is a feature of the invention that the choke is of the in-line design with a removable bonnet for top entry service of the choke. Each sleeve preferably includes two radially opposing flow ports, so that the choke is ideally suited for one-quarter turn operation between a fully opened position and a fully closed position. Upper and lower annular elastomeric seals are provided for guiding rotation between the stationary sleeve and the rotary sleeve. The choke is desirably designed so that numerous components are pressure balanced, thereby reducing the required operating torque.

It is an advantage of the present invention that the choke is useful for reliably handling various corrosive fluids and fluids containing contaminants. The in-line design results in the choke being particularly well suited for various hydrocarbon recovery applications. An annulus between the outer stationary sleeve and the interior cylindrical surface on the choke body may be vented with a pressure relief valve. The life of the inner sleeve may be substantially enhanced by providing a wear-resistant material sleeve within the inner sleeve.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
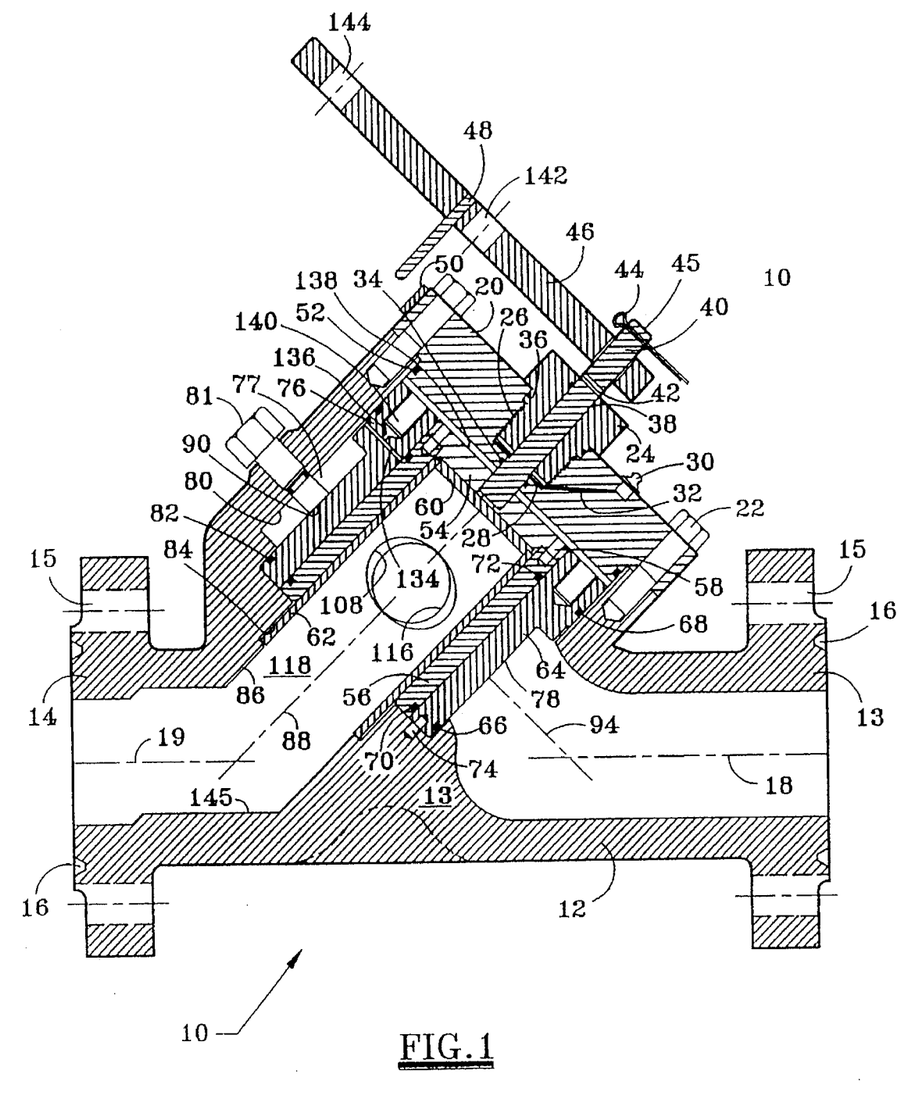
FIG. 1 is a side view, partially in cross-section, of a suitable choke according to the present invention.

The choke 10 as shown in FIG. 1 includes a body 12 with opposing flanged ends 13 and 14. Each flanged end includes an annular groove 16 for receiving a conventional metal ring (not shown) for sealing engagement between the choke and upstream and downstream flanges of a flow line. Each flange 13 and 14 is provided with a plurality of circumferentially spaced apertures 15 for receiving bolts (not shown) for the flanged interconnection. Those skilled in the art will appreciate that the body 12 may be provided with threaded ends adjacent the inlet port and outlet port, although flanged connections are preferred for many high pressure applications. The inlet port to the choke has a inlet axis 18 which is preferably substantially aligned with the outlet axis 19 of the outlet port, thereby maintaining a desired in-line design for the choke to facilitate connection of the choke with aligned upstream and downstream flow lines.

Bonnet cover 20 may be removably secured to the body 12 by a plurality of cap screws 22. A retainer nut 24 is connected to the bonnet cover 20 by threads 26. A thrust bearing assembly 28 is sandwiched between the bonnet cover 20 and a lower surface on the retainer nut 24. This thrust bearing assembly may include both a thrust bearing and a lower and upper washer. A grease fitting 30 is provided for supplying lubricant to the thrust bearing assembly via passageway 32 within the bonnet cover 20.

A cylindrical passageway in the retainer nut 24 receives stem 40, which extends downward through the lower face of the bonnet cover 20. Sealed engagement between the bonnet cover 20 and the stem 40 is provided by a combined T-seal and O-ring seal 34. Annular seal 36 may be provided for protecting the threads 26 from the environment. O-ring seal 38 between the stem 40 and the retainer nut 24 and seal 36 also provide a backup to seal 34. A cotter pin hole 42 may be provided in the stem for retaining a pin (not shown) for engaging the upper face of the retainer nut 24, thereby preventing the retainer nut 24 from inadvertently unthreading from the bonnet cover 20.

Upper cotter pin 44 is depicted in FIG. 1 for removably mounting a handle 46 to the stem 40 in a conventional manner. Those skilled in the art will understand that the top portion 45 of the stem may be provided with a desired profile for receiving a powered actuator, or for cooperating with the profile of a hole in the handle. Indicator pin 48 is provided on the handle for operating with indicator band 50 provided on the outer surface of the bonnet cover 20, thereby providing the operator with a visual indication of the flow position of the valve, e.g., one quarter open or fully closed.

A static seal between the body 12 and the bonnet cover 20 is obtained by O-ring seal 52. The body 12 forms a generally cylindrical cavity therein which in turn may be formed from cylindrical interior walls 80, 82, 84, and 86 on the valve body, with each cylindrical wall being defined about a common sleeve axis 88. An outer stationary sleeve 64 having a central sleeve axis coaxial with axis 88 may be secured to the body 12 at a desired rotational orientation by a plurality of pins 74. A seal 68 at the upper end of stationary sleeve 64 provides for sealed engagement between the outer sleeve and the cylindrical surface 80 on the body 12. A lower seal 66 similarly seals between the lower end of the stationary sleeve 64 and the first reduced cylindrical surface 82 on the body. The rotary sleeve 56 is rotatably mounted within the stationary outer sleeve 64. The rotary sleeve 56 has a central sleeve axis co-axial with axis 88, and is rotatable about axis 88.

A lower annular T-seal 70 provides for sealed engagement between the lower end of the inner sleeve and the lower end of the stationary sleeve. An upper annular spacer 72, which preferably is also a T-seal, is provided between the upper end of the rotary sleeve and an interior cylindrical surface of the stationary sleeve 64. Each of the T-seals 70 and 72 is preferably an elastomeric and polymeric member, and maintains a thin uniform gap between the outer cylindrical surface of the rotary sleeve and the inner cylindrical surface of the stationary sleeve. The radial spacing between the first restricted cylindrical surface 82 and the second restricted cylindrical surface 84 on the body is thus sized to accommodate the thickness of both the stationary outer sleeve 64 and the rotary inner sleeve 56.

Wear sleeve 62 may be press fitted within and is thereby fixedly secured to the inner sleeve 56. The wear sleeve alternatively may be fixed to the inner sleeve by other techniques, including soldering, epoxy bonding, or shrink fitting. This wear sleeve may be formed from a wear-resistant material, such as tungsten carbide or an alumina oxide ceramic, and extends axially downward for covering a portion of the second restricted cylindrical surface 84 on the body. Sealing between the wear sleeve 62 and the body 12 is not required. The interior surface of the wear-resistant sleeve is thus slightly less than the diameter of cylindrical surface 84 on the body, and the interior surface of the cylindrical sleeve has a diameter substantially equal to the cylindrical wall 86 on the body, thereby obtaining a substantially laminar streamline flow out of the sleeves along the axis 88. The rotary sleeve also includes an upper closed end formed by back plate 54 interconnected with the upper end of the rotary sleeve 56 by conventional securing members 58. A top wear plate 60 is provided for covering the interior surface of the back plate 54. The material of plate 60 may be the same as that of wear sleeve 62.

The stationary outer sleeve includes an upper shoulder 76, thereby forming an annulus 77 between the outer cylindrical surface 78 of the stationary sleeve 64 and the cylindrical surface 80 on body 12. A pressure relief bleed valve 81 is provided within a threaded port in the body 12, and provides for venting from annulus 77. The end 90 of the bleed valve 81 may be forced into engagement with the outer cylindrical sleeve 64, and acts to prevent removal of the outer cylindrical sleeve from the body until the pressure is first bled from the annulus 77. The bleed valve 81 also cooperates with the pins 74 to prevent the outer sleeve 64 from rotating within the body 12.

Figure 2:
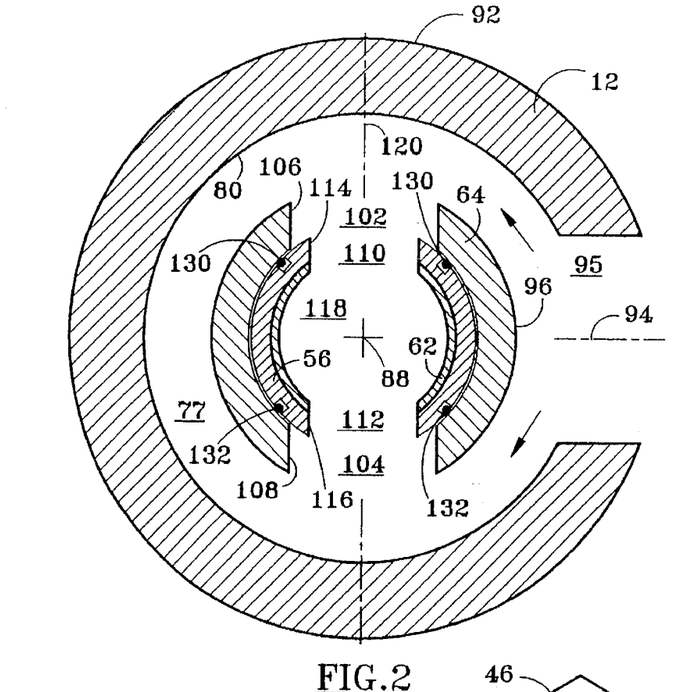
FIG. 2 is a cross-sectional view of a portion of the choke as shown in FIG. 1. The cross-section is taken through the sleeve ports and perpendicular to the sleeve axis. The pressure relief valve is not depicted in FIG. 2 for clarity of the depicted components.

FIG. 2 depicts the self-impingement concept for the flowing fluid according to the present invention, and also illustrate the flow ports within the inner and outer sleeves. The body 12 may have a generally cylindrical exterior surface 92 sized for forming the cylindrical chamber 80 therein. The flow path within the body 12 from the fluid inlet is diverted generally upward and substantially along inclined axis 94 by the central raised portion 13 of the body, as shown in FIG. 1. Fluid flow along axis 94 inputs the fluids circumferentially through a side inlet 95 in the body leading to the cylindrical chamber formed by surface 80. Exterior surface 96 of the stationary sleeve 64 diverts fluid substantially equally toward each side of the annulus 77 between the stationary outer sleeve and the body 12.

The outer sleeve includes two radially opposing flow ports 102 and 104 therein each having an annular side wall 106 and 108, respectively. When the choke is in the open position as shown in FIG. 2, ports 102 and 104 in the outer sleeve are substantially aligned with the ports 110 and 112 passing through the inner sleeve. Ports 110 and 112 each have a side wall 114 and 116, respectively, and preferably has a circular configuration, as shown in FIG. 1. FIG. 1 also depicts that the configuration of the side walls 106 and 108 of the ports in the outer sleeve may be slightly elliptical, so that the ports in the inner sleeve 56 define the cross-sectional flow area through the choke. The interior surface of the wear sleeve 62 secured to the rotatable sleeve 56 thus forms a generally cylindrical chamber 118 therein. The interior surface of the inner sleeve is preferably protected by the wear-resistant material to prevent cavitation and erosion on the interior walls of the inner sleeve due to the high pressure drop generally occurring across the choke.

The ports 102 and 104 in the outer sleeve 64 are each formed about a common axis 120 which preferably is positioned at 90° relative to the axis of the side port 95. Those skilled in the art will appreciate that the design as shown in FIG. 2 causes the flow though the inner and outer sleeves to impinge upon itself within the chamber 118, thereby desirably dissipating energy and contributing to the pressure reduction through the choke without high wear on the choke components.

Figure 3:
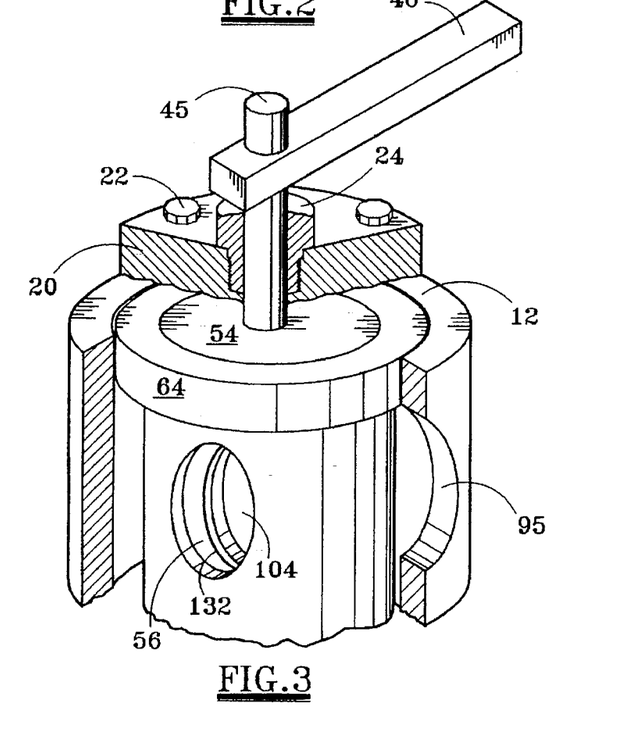
FIG. 3 is a simplified pictorial view, partially in cross-section, illustrating a rotatably inner sleeve in a partially opened position with respect to the outer sleeve.

The disclosed embodiment illustrates the elastomeric seals 130 and 132 each fitted within an elliptical groove cut within the outer cylindrical surface of the rotary sleeve 56 and surrounding each of the respective radially opposing flow ports 110 and 112. This design allows for quick opening of the choke with a small dead band, thereby allowing the choke to be opened from a fully closed position with relatively little angular rotation of the stem by the handle. When the choke is in the fully opened position or the fully closed position, the entire circumference of each seal 130 and 132 is in engagement with the internal cylindrical surface of the stationary sleeve 64. When the choke is closed, the elastomeric seals provide a bubble-tight shutoff of flow from the annulus 77 to the chamber 118, and thus prevent flow through the body 12. When the choke is in the partially closed position, as shown in FIG. 3, a portion of each seal 130 and 132 is exposed to the flow port in the stationary outer sleeve and thus sealed engagement between the rotary sleeve and the stationary sleeve is not obtained. In this partially closed position, another portion of each seal 130 and 132 will, however, remain sandwiched between the rotary sleeve and the stationary sleeve, thereby assisting in maintaining each seal within its respective groove.

Referring again to FIG. 1, a flowthrough port 134 is provided in the stationary outer sleeve for maintaining fluid communication between the annulus 77 and the outer cylindrical surface of the inner rotary sleeve 56. Regardless of the position of the choke, the elastomeric seals 130 and 132 will thus be exposed to inlet fluid pressure to the choke on both sides of the seal. When the choke is closed, the interior of each seal 130 and 132 is exposed directly to the inlet fluid pressure, while the outside of each seal is exposed to substantially the same pressure in the annulus between the inner sleeve and the outer sleeve. The pressure across these seals is also balanced when the choke is partially or fully open. This feature prevents the seals 130 and 132 from being extruded into the gap between the sleeves and thereby being cut when the choke is initially opened. A flow passageway 136 is also provided in the stationary outer sleeve 64 for maintaining fluid communication between the annulus 77 and the cavity separating the top of the sleeves and the bonnet cover 20. Inlet pressure to the choke is thus passed to the upper external surface 138 of the closed end of the radially inner sleeve. As soon as the choke is cracked open, fluid pressure in the chamber 118 creates an upward force on the inner rotary sleeve 56. This upward force is offset by the opposing downward force acting on the external surface 138 of the rotary sleeve, thereby facilitating low torque operation of the choke. The fluid passageway 136 also creates a substantially balanced pressure across the upper annular elastomeric T-seal 72.

The annular seals 70 and 72 thus maintain a slight yet uniform gap between the outer cylindrical surface of the rotary sleeve and the inner cylindrical surface of the stationary sleeve. This annular gap is shown exaggerated in FIG. 2 for clarity. Accordingly, fluid flow between the two cylinders is limited by this slight annular gap. Moreover, if the seals 130 and 132 fail, flow through the choke when in the fully closed position will still be severely limited by this annular gap. High friction is avoided between the sleeves when the choke is operated. The upper and lower spacers also contribute to the reliability and long life of the seals 130 and 132. Each of the upper seals 68 and 72 thus need not provide a sealing function because of the passageway 136 around these seals. The seal 72 is, however, particularly important for serving as a spacer for guiding rotation of the rotary sleeve within the stationary sleeve, and for preventing flow between the sleeves, thereby preventing corrosion and erosion. Maintenance of the choke is significantly enhanced by preventing flow between the sleeves due to seal 72. Seal 68 similarly prevents flow between the outer sleeve and the body, thereby facilitating removal of the outer sleeve during choke maintenance operations.

Both the stationary and rotary sleeves and the seals in the choke may be easily inspected and replaced, if necessary. With the flow shut off in the flow line, the choke may be serviced without removing the body 12 from the flow line. The bleed valve 81 may first be unthreaded one or two turns, thereby both releasing the end of the bleed valve from engagement with the outer sleeve, and venting any residual pressure in the annulus 77. The handle 46 and nut 24 may then be removed. The bolts 22 may then be unthreaded so that the bonnet cover 20 may be removed from the body 12. The stem 40 may be provided with a keyway and key for rotational connection with plate 54. Additionally, the stem may be press fit into the back plate 54 with sufficient interference to resist slipping or turning in the back plate.

In some applications, the outer sleeve 64 may become firmly fixed within the body 12. In order to assist in removal of the outer sleeve, the handle may be placed on top of the exposed upper end of the body 12, and the bolts 22 inserted into the apertures 142 and 144, which are aligned with the threaded ports 140 in the upper end of the stationary sleeve. Rotation of the bolts 22 within the threaded ports 140 will thus lift the stationary sleeve upward within the body 12, thereby breaking the temporary fixed engagement of the stationary sleeve within the body. In many cases, the rotary inner sleeve will be removed from the body 12 with the outer sleeve. Each of the seals may then be checked and replaced, if necessary. Also, the wear sleeve 62 may be checked to insure that it has enough material remaining to protect the inner sleeve before the next choke servicing operation. The choke may then be assembled in a reverse operation. The top entry design of the choke according to the present invention facilitates service for the choke, and substantially reduces the cost and expense associated with properly maintaining the choke.

It is a feature of the invention that each of the flow ports in both the inner sleeve and outer sleeve are positioned within a plane perpendicular to the sleeve axis 88 which is inclusive of the flow port 95 in the body 12. In other words, a plane perpendicular to axis 88 passes through the flow ports in the stationary and rotary sleeves, and also through the side inlet 95 leading to the chamber formed by cylindrical surface 80. While the flow ports in the sleeves could be moved along the axis 88 from the position as shown in FIG. 1, positioning the flow ports as depicted contributes to the desired flow impingement and minimum wear on the choke components. By increasing the length along axis 88 between the flow ports in the sleeves and the lower ends of the sleeves, sufficient space is provided for the fluid flow to recover from turbulence and obtain a laminar flow profile before the fluid hits the body at surface 145, as shown in FIG. 1. To obtain the desired flow impingement within the chamber 118, the ports substantially overlap when the choke is fully open, as shown in FIGS. 1 and 2.

Those skilled in the art will appreciate that the elastomeric seals 130 and 132 provided within the grooves on the rotary inner sleeve 56 alternatively may be provided within grooves on the inner circumferential surface of the outer sleeve and surrounding the flow ports 102 and 104 in the outer sleeve. Machining elliptical grooves in the outer sleeve is considerably more difficult, however, than machining elliptical grooves in the inner sleeve. Similarly, the upper and lower T-seals 70 and 72 may be provided within grooves on the outer sleeve, and still maintain a desired uniform gap between the outer cylindrical surface of the inner sleeve and the inner cylindrical surface of the outer sleeve. Each of these seals is preferably fabricated from a polymeric material. Teflon™ and Viton™ material seals may be preferred for some applications. T-seals are commercially available from several suppliers.

It is a feature of the present invention to provide two radially opposing ports in each of the outer sleeve and inner sleeve so that one-quarter turn operation of the choke between the fully open and fully closed positions may be obtained. It is possible to achieve the desired flow impingement concept of the present invention by providing more than two flow ports in each sleeve. Corresponding ports should be oriented 180° from each other to maintain a 90° stem rotation for full open to full closed valve functioning. Nevertheless, ports in each sleeve could be staggered so that all ports are not spaced the same distance along axis 88. Only two holes per sleeve is preferred because erosion increases as the number of ports increases. The size and shape of the ports may vary from the depicted embodiment. If more than two flow ports are provided in each of the inner sleeve and outer sleeve, the diameter of each flow port may be reduced compared to the depicted embodiment. It is important, however, to provide for sealing engagement between the rotary sleeve and the stationary sleeve both when the choke is in the fully closed position and when the choke is in the fully closed position.

A preferred embodiment of the invention as discussed above includes a stationary outer sleeve and a rotary inner sleeve. From the above description, those skilled in the art will appreciate that it is possible to provide a stationary inner sleeve secured to the body 12, and a rotary sleeve radially outward of the inner sleeve and rotated by the stem 40. In this alternative embodiment, either the stationary inner sleeve or the rotary outer sleeve, or both, may include an upper closed end.

Various modifications to the equipment and to the techniques described herein should be apparent from the above description of these preferred embodiments. Although the invention has thus been described in detail for several embodiments, it should be understood that this explanation is for illustration, and that the invention is not limited to these embodiments. Other modifications to the choke and the described method will thus be apparent to those skilled in the art in view of this disclosure. Such modifications may be made without departing from the spirit of the invention, which is defined in the claims.

What is claimed is:

1. A choke for controlling the flow of fluid along a pressurized flow line, the choke comprising:

a body having a fluid inlet and a fluid outlet;

a stationary sleeve secured to the body, the stationary sleeve having a sleeve axis and radially opposing first and second sleeve flowthrough ports;

a rotary sleeve rotatably mounted with respect to the stationary sleeve and rotatable about the sleeve axis, the rotary sleeve including radially opposing third and fourth sleeve flow ports therein, the rotary sleeve and the stationary sleeve each having a lower open end in fluid communication with the fluid outlet;

one of the stationary sleeve and the rotary sleeve being a radially inner sleeve;

a wear sleeve formed from a wear-resistant material, the wear sleeve being positioned radially within and secured to the inner sleeve;

a seal circumferentially surrounding each sleeve flow port in one of the stationary sleeve and rotary sleeve for sealing between the stationary sleeve and the rotary sleeve when the choke is in a closed position; and a stem for controlling rotation of the rotary sleeve to selectively adjust the circumferential position of both the first port with respect to the third port and the second port with respect to the fourth port and thereby control the flow of fluid through the choke.

2. The choke as defined in claim 1, wherein the fluid inlet has an inlet axis substantially aligned with an outlet axis of the fluid outlet.

3. The choke as defined in claim 1, further comprising:

one of the stationary sleeve and the rotary sleeve being a radially outer sleeve; and the body and the outer sleeve defining an annulus therebetween in fluid communication with the fluid inlet and with the sleeve flow ports in the outer sleeve.

4. The choke as defined in claim 1, further comprising:

a lower seal for guiding rotation of the rotary sleeve with respect to the stationary sleeve; and an upper seal spaced axially opposite the lower elastomeric spacer with respect to the elastomeric seal for guiding rotation of the rotary sleeve with respect to the stationary sleeve.

5. The choke as defined in claim 1, further comprising:

the rotary sleeve is the radially inner sleeve, and the rotary sleeve having an upper closed end; and a wear plate formed from a wear-resistant material covering an interior surface of the closed end of the rotary sleeve.

6. The choke as defined in claim 1, further comprising:

one of the stationary sleeve and the rotary sleeve being a radially outer sleeve; and a pressure relief member for relieving fluid pressure from a cavity between the body and the radially outer sleeve.

7. The choke as defined in claim 1, further comprising:

a valve bonnet mounted on the valve body and having a passageway therein for receiving the valve stem; and the bonnet being removably affixed to the valve body for facilitating removal of the bonnet and removal of both the stationary sleeve and the rotary sleeve from the body.

8. The choke as defined in claim 1, further comprising:

one of the stationary sleeve and the rotary sleeve being a radially outer sleeve, and the other of the stationary sleeve and rotary sleeve being a radially inner sleeve; and a flowthrough port in the outer sleeve for providing fluid communication between the fluid inlet and an outer surface of the radially inner sleeve.

9. The choke as defined in claim 8, further comprising:

the rotary sleeve having an upper closed end; and a fluid passageway in the radially outer sleeve for providing fluid communication between the fluid inlet and an external surface of the closed end of the radially inner sleeve.

10. A choke for controlling the flow of fluid along a pressurized flow line, the choke comprising:

a body having a fluid inlet with an inlet axis, a fluid outlet with an outlet axis, the inlet axis being substantially aligned with the outlet axis, a cylindrical chamber within the body, and an inlet flow path to the cylindrical chamber having a flow path axis inclined relative to the inlet axis;

a stationary outer sleeve secured within the cylindrical chamber within the body, the stationary outer sleeve having a sleeve axis and radially opposing first and second sleeve flowthrough ports therethrough each in fluid communication with the fluid inlet, each of the first and second sleeve flow ports being spaced circumferentially approximately 90° from the flow path axis such that fluid from the fluid inlet impinges the stationary sleeve upon entering the cylindrical chamber and is diverted to the circumferentially spaced first and second sleeve flowthrough ports;

a rotary inner sleeve rotatably mounted within the stationary outer sleeve and rotatable about the sleeve axis, the rotary inner sleeve including radially opposing third and fourth sleeve flow ports therein, the rotary sleeve having an upper closed end an a lower open end in fluid communication with the fluid outlet;

a valve bonnet removably affixed to the valve body at a location spaced from both the fluid inlet and the fluid outlet for facilitating removal of the stationary outer and the rotary inner sleeve from the body;

a seal circumferentially surrounding each sleeve flow port in one of the stationary sleeve and rotary sleeve for sealing between the stationary outer sleeve and the rotary inner sleeve when the choke is in a closed position; and a stem for controlling rotation of the rotary sleeve to selectively adjust the circumferential position of both the first port with respect to the third port and the second port with respect to the fourth port and thereby control the flow of fluid through the choke.

11. The choke as defined in claim 10, further comprising:

the body and the stationary outer sleeve defining an annulus therebetween in fluid communication with the fluid inlet and with the first and second sleeve flow ports.

12. The choke as defined in claim 10, further comprising:

a lower seal between an outer circumferential surface on the stationary sleeve and an inner circumferential surface of the rotary sleeve for guiding rotation of the rotary sleeve within the stationary sleeve; and an upper seal between an outer circumferential surface of the stationary sleeve and an inner circumferential surface of the rotary sleeve for guiding rotation of the rotary sleeve within the stationary sleeve.

13. The choke as defined in claim 10, further comprising:

a wear sleeve formed from a wear-resistant material, the wear sleeve being positioned radially within and secured to the rotary inner sleeve.

14. The choke as defined in claim 10, further comprising:
a flowthrough port in the stationary outer sleeve for providing fluid communication between the fluid inlet and an outer surface of the rotary inner sleeve.

15. The choke as defined in claim 10, further comprising:
a fluid passageway in the stationary outer sleeve for providing fluid communication between the fluid inlet and an external surface of the closed end of the rotary inner sleeve.

16. A method of controlling the flow of fluid along a pressurized flow line, the method comprising:
providing a body having a fluid inlet and a fluid outlet;
securing a stationary sleeve within the body, the stationary sleeve having a sleeve axis and radially opposing first and second sleeve flow ports therethrough;
rotatably mounting a rotary sleeve within the body and rotatable about the sleeve axis, the rotary sleeve including radially opposing third and fourth sleeve flow ports therein;
forming a flowthrough port in the stationary sleeve for providing fluid communication between the fluid inlet and an outer surface of the rotary sleeve;
sealing between the stationary sleeve and the rotary sleeve and circumferentially about the sleeve flow ports in one of the stationary sleeve and the rotary sleeve when the choke is in a closed position; and
rotating the rotary sleeve to selectively adjust the circumferential position of both the first port with respect to the third port and the second port with respect to the fourth port to control the flow of fluid through the choke.

17. The method as defined in claim 15, further comprising:
forming an annulus between the body and the stationary sleeve, the annulus being in fluid communication with the fluid inlet and with the first and second sleeve flow ports.

18. The method as defined in claim 17, further comprising:
guiding rotation of the rotary sleeve with respect to the stationary sleeve with upper and lower annular guides between the stationary sleeve and the rotary sleeve.

19. The method as defined in claim 16, further comprising:
forming an upper closed end on the rotary sleeve; and
forming a fluid passageway in the stationary sleeve for providing fluid communication between the fluid inlet and an external surface of the closed end of the rotary sleeve.

20. A choke for controlling the flow of fluid along a pressurized flow line, the choke comprising:
a body having a fluid inlet and a fluid outlet;
a stationary sleeve secured to the body, the stationary sleeve having a sleeve axis and radially opposing first and second sleeve flowthrough ports;
a rotary sleeve rotatably mounted with respect to the stationary sleeve and rotatable about the sleeve axis, the rotary sleeve including radially opposing third and fourth sleeve flow ports therein, the rotary sleeve and the stationary sleeve each having a lower open end in fluid communication with the fluid outlet;
a seal circumferentially surrounding each sleeve flow port in one of the stationary sleeve and rotary sleeve for sealing between the stationary sleeve and the rotary sleeve when the choke is in a closed position;
one of the stationary sleeve and the rotary sleeve being a radially outer sleeve, and the other of the stationary sleeve and rotary sleeve being a radially inner sleeve;
a flowthrough port in the outer sleeve for providing fluid communication between the fluid inlet and an outer surface of the radially inner sleeve; and
a stem for controlling rotation of the rotary sleeve to selectively adjust the circumferential position of both the first port with respect to the third port and the second port with respect to the fourth port and thereby control the flow of fluid through the choke.

21. The choke as defined in claim 20, wherein the fluid inlet has an inlet axis substantially aligned with an outlet axis of the fluid outlet.

22. The choke as defined in claim 20, further comprising:
the rotary sleeve is the radially inner sleeve, and the rotary sleeve having an upper closed end; and
a wear plate formed from a wear-resistant material covering an interior surface of the closed end of the rotary sleeve.

23. The choke as defined in claim 20, further comprising:
a valve bonnet mounted on the valve body and having a passageway therein for receiving the valve stem; and
the bonnet being removably affixed to the valve body for facilitating removal of the bonnet and removal of both the stationary sleeve and the rotary sleeve from the body.

24. The choke as defined in claim 20, further comprising:
the rotary sleeve having an upper closed end; and
a fluid passageway in the radially outer sleeve for providing fluid communication between the fluid inlet and an external surface of the closed end of the radially inner sleeve.

25. The choke as defined in claim 20, wherein the stationary sleeve is the outer sleeve, each of the first and second sleeve flow ports in the stationary outer sleeve being spaced circumferentially such that fluid from the fluid inlet impinges the stationary sleeve and is diverted to the circumferentially spaced first and second sleeve flowthrough ports.

26. A choke for controlling the flow of fluid along a pressurized flow line, the choke comprising:
a body having a fluid inlet with an inlet axis, a fluid outlet with an outlet axis, a cylindrical chamber within the body, and an inlet flow path to the cylindrical chamber having a flow path axis;
a stationary outer sleeve secured within the cylindrical chamber in the body, the stationary outer sleeve having a sleeve axis and radially opposing first and second flowthrough ports each in fluid communication with the inlet flow path, each of the first and second flowthrough ports being spaced circumferentially from the flow path axis such that fluid from the fluid inlet impinges a solid barrier portion of the stationary outer sleeve extending circumferentially between the first and second flowthrough ports upon entering the cylindrical chamber and is diverted by the solid barrier portion to the circumferentially spaced first and second flowthrough ports;
a rotary inner sleeve rotatably mounted with respect to the stationary outer sleeve and rotatable about the sleeve axis, the rotary inner sleeve including radially opposing third and fourth flow ports therein, the rotary inner sleeve and the stationary outer sleeve each having an open end in fluid communication with the fluid outlet;
a seal circumferentially surrounding each flow port in one of the stationary outer sleeve and rotary inner sleeve for sealing between the stationary outer sleeve and the rotary inner sleeve when the choke is in a closed position; and a stem for controlling rotation of the rotary inner sleeve to selectively adjust the circumferential position of both the first port with respect to the third port and the second port with respect to the fourth port and thereby control the flow of fluid through the choke.

27. The choke as defined in claim 26, further comprising:

a wear sleeve formed from a wear-resistant material, the wear sleeve being positioned radially within and secured to the rotary inner sleeve.

28. The choke as defined in claim 26, further comprising:

the rotary inner sleeve having an upper closed end; and a wear plate formed from a wear-resistant material covering an interior surface of the closed end of the rotary inner sleeve.

29. The choke as defined in claim 26, further comprising:

a valve bonnet mounted on the valve body and having a passageway therein for receiving the valve stem; and the bonnet being removably affixed to the valve body for facilitating removal of the bonnet and removal of both the stationary outer sleeve and the rotary inner sleeve from the body.

30. The choke as defined in claim 26, further comprising:

the rotary inner sleeve having an upper closed end; and a fluid passageway in the radially outer stationary sleeve for providing fluid communication between the fluid inlet and an external surface of the closed end of the rotary inner sleeve.

* * * * *

UNITED STATES PATENT AND TRADEMARK OFFICE
CERTIFICATE OF CORRECTION

PATENT NO. : 5,623,966
DATED : April 29, 1997
INVENTOR(S) : John E. Rodger

It is certified that error appears in the above-indentified patent and that said Letters Patent is hereby corrected as shown below:

Column 11, line 33, change "claim 15," to --claim 16,--.

In Column 11, line 43, change "claim 16," to --claim 17,--.

Signed and Sealed this

Seventh Day of October, 1997

Attest:

BRUCE LEHMAN

Attesting Officer

Commissioner of Patents and Trademarks